(12) United States Patent
Lee

(10) Patent No.: US 8,913,881 B2
(45) Date of Patent: Dec. 16, 2014

(54) DIGITAL VIDEO RECORDER HAVING APPARTUS FOR RECEIVING AUTOMATIC SWITCHED IMAGE BY RECOGNIZING SOURCE AND METHOD THEREOF

(71) Applicant: 3R Global Co., Ltd., Seoul (KR)

(72) Inventor: Kyung Sug Lee, Seoul (KR)

( * ) Notice: Subject to any disclaimer, the term of this patent is extended or adjusted under 35 U.S.C. 154(b) by 58 days.

(21) Appl. No.: 13/939,043

(22) Filed: Jul. 10, 2013

(65) Prior Publication Data
US 2014/0119708 A1     May 1, 2014

(30) Foreign Application Priority Data
Oct. 30, 2012   (KR) .................. 10-2012-0121051

(51) Int. Cl.
| | |
|---|---|
| H04N 5/92 | (2006.01) |
| H04N 5/765 | (2006.01) |
| H04N 5/89 | (2006.01) |
| H04N 5/93 | (2006.01) |
| H04N 9/87 | (2006.01) |
| H04N 5/77 | (2006.01) |
| H04N 9/79 | (2006.01) |
| H04N 21/433 | (2011.01) |
| H04N 21/44 | (2011.01) |
| H04N 5/935 | (2006.01) |
| H04N 5/932 | (2006.01) |

(52) U.S. Cl.
CPC . *H04N 9/87* (2013.01); *H04N 5/77* (2013.01); *H04N 9/7921* (2013.01); *H04N 21/4334* (2013.01); *H04N 21/44008* (2013.01)
USPC ........... 386/326; 386/211; 386/215; 386/217; 386/232; 386/335; 386/353

(58) Field of Classification Search
USPC .......... 386/211, 215, 217, 232, 326, 335, 353
See application file for complete search history.

(56) References Cited

U.S. PATENT DOCUMENTS

| | | | |
|---|---|---|---|
| 6,323,787 B1 * | 11/2001 | Yamashita | 341/58 |
| 6,493,361 B1 * | 12/2002 | Yamaguchi et al. | 370/532 |
| 6,618,095 B1 * | 9/2003 | Takeuchi et al. | 348/476 |
| 8,565,586 B2 * | 10/2013 | Maskatia et al. | 386/291 |
| 2010/0091888 A1 * | 4/2010 | Nemiroff | 375/240.28 |
| 2010/0150531 A1 * | 6/2010 | Corry et al. | 386/123 |
| 2010/0192178 A1 * | 7/2010 | Candelore | 725/39 |
| 2011/0299836 A1 * | 12/2011 | Amsterdam et al. | 386/295 |
| 2012/0136612 A1 * | 5/2012 | Vanderhoff et al. | 702/119 |

FOREIGN PATENT DOCUMENTS

| | | |
|---|---|---|
| JP | 2003-224869 | 8/2003 |
| KR | 10-0287728 | 4/2001 |

* cited by examiner

*Primary Examiner* — Daquan Zhao
(74) *Attorney, Agent, or Firm* — East West Law Group; Heedong Chae (57) ABSTRACT

The present invention relates to a digital video recorder having an apparatus for receiving an automatic switched image by recognizing a source and a method thereof, which is capable of automatically determining whether an image channel is a SD signal channel or a HD-SDI signal channel and switching between these channels. The present invention has an advantage in that it provides a DVR having a source recognition automatic switched image receiving apparatus which is capable of automatically detecting whether an image signal is a SD signal or a HD-SDI signal in a channel and automatically switches between these signals, thereby allowing free channel change without requiring separate setting, which can result in higher flexibility of installation and channel setting and improved utilization of existing lines, and a method thereof.

9 Claims, 4 Drawing Sheets

FIG.1

-- Prior Art --

DIGITAL VIDEO RECORDER HAVING APPARTUS FOR RECEIVING AUTOMATIC SWITCHED IMAGE BY RECOGNIZING SOURCE AND METHOD THEREOF

CROSS-REFERENCE TO RELATED APPLICATION

This application claims the benefit of Korean Application No. 10-2012-0121051, filed on Oct. 30, 2012, with the Korean Intellectual Property Office, the disclosure of which is incorporated herein by reference.

BACKGROUND OF THE INVENTION

1. Field of the Invention

The present invention relates to a digital video recorder having an apparatus for receiving an automatic switched image by recognizing a source and a method thereof, which is capable of automatically determining whether an image channel is a SD signal channel or a HD-SDI signal channel and switching between these channels.

2. Description of the Related Art

When a conventional SD class CCTV is to be switched to a HD class monitoring system, an IP-based NVR is a target for switching. However, an IP-based system requires removal of existing CCTV infrastructures and construction of a new IP-based infrastructure, which acts as a barrier against introduction.

In this regard, in recent years, a DH-SDI (High Definition-Serial Digital Interface) technology to utilize the existing CCTV infrastructure to enable HD image monitoring is in the spot light.

As one of digital video transmission standards specified by SMPTE (Society of Motion Picture and Television Engineers), HD-SDI is being mainly used for HD cameras and broadcasting equipment for HD digital broadcasting.

In particular, a HD-SDI format beneficial for implementation of high definition image with the minimum of 720p (1280×720) begins to create a boom in company with the demand of CCTV market to seek high quality images.

A HD CCTV of the HD-SDI format can reuse the existing CCTV infrastructure and the HD CCTV and HD DVR provide the same user interface (UI) as architecture of existing CCTV and DVR.

In addition, a HD CCTV camera has many merits in that it can transmit a digital video as well as 720p and 1080p image formats corresponding to a resolution about six times as high as that of an NTSC/PAL system.

However, the HD CCTV of the current HD-SDI has a demerit of limitation on an image transmission distance and expensive parts.

For example, to facilitate reuse of the HD CCTV infrastructure, the image transmission distance has to be more than 300 mm, like existing CCTVs but does not reach a half thereof with the current HD-SDI technique.

In addition, HD-SDI transmission/reception chip sets serving as core parts of HD-SDI techniques are more expensive than IP type high-definition cameras.

In this manner, since the image transmission distance is much reduced when the HD-SDI technique is applied to lines for existing SD class image transmission, reutilization of the existing lines is practically infeasible and distance limitation frequently occurs in on construction of new lines.

Accordingly, in recent years, for the purpose of facilitating reutilization of existing lines, there has been proposed a DVR in which some channels support HD-SDI and some channels support SD while using HD class image monitoring only for a region requiring high-definition monitoring, whereas using SD class image monitoring for a region requiring no high-definition monitoring.

Figure 1:
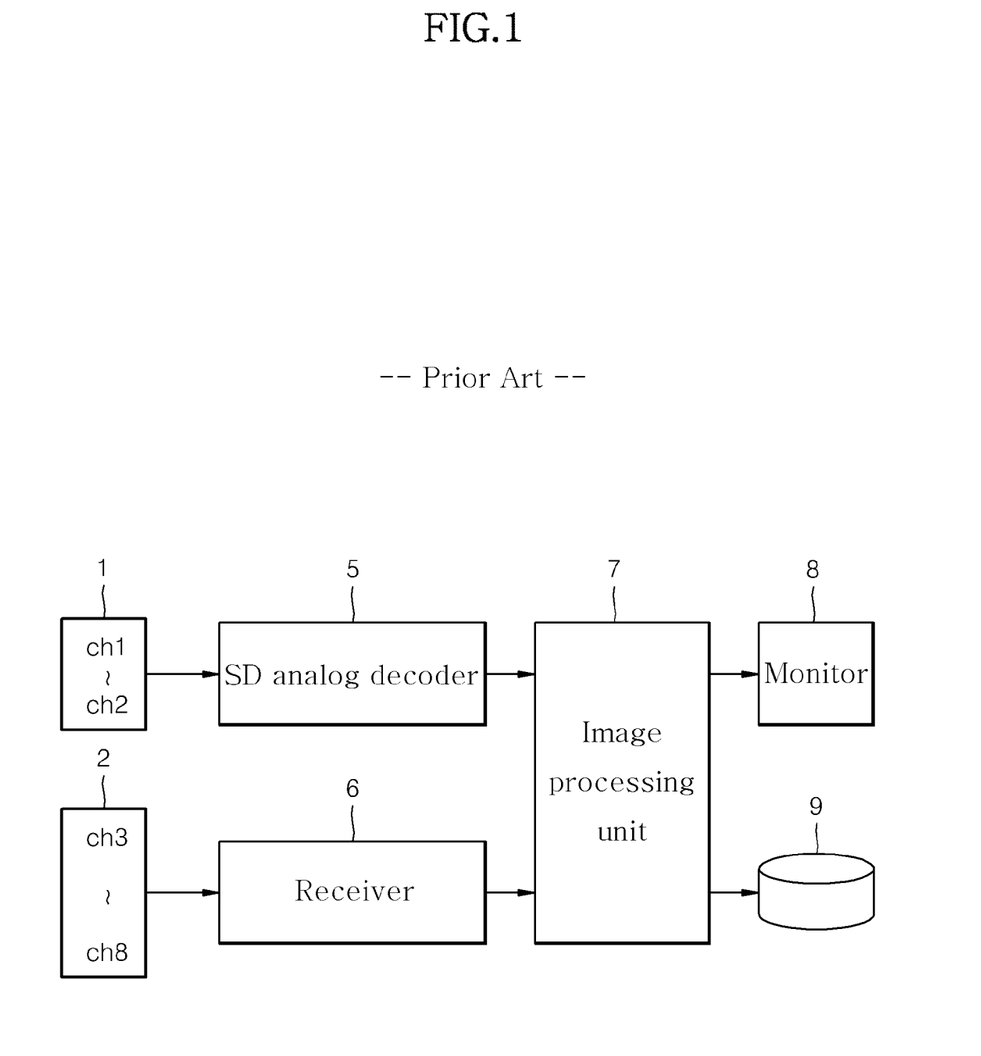
FIG. 1 is a block diagram of a DVR having the existing SD signal channel and HD-SDI signal channel.

FIG. 1 is a block diagram of a DVR having the existing SD signal channel 1 and HD-SDI signal channel 2.

Referring to FIG. 1, the existing SD signal channel 1 provides SD class image which is decoded by a SD analog decoder 5. An image output from an image processing unit 7 is reproduced on a monitor 8 or stored in a storage 9.

The HD-SDI signal channel 2 in a region requiring high-definition monitoring provides a HD-SDI class image which is decoded by a receiver 6. An image output from the image processing unit 7 is reproduced on the monitor 8 or stored in the storage 9.

However, due to physical separation of the SD signal channel 1 and the HD-SDI signal channel 2, this configuration has a difficulty in installation of these channels 1 and 2. In addition, since these channels 1 and 2 use the same BNC interface, an installation error occurs frequently when general users install or changes these channels 1 and 2.

In addition, the DVR having the existing SD signal channel 1 and HD-SDI signal channel 2 have a low possibility of reutilization of existing lines. Further, since these channels 1 and 2 are not easy to be changed, the DVR is too inconvenient to use it due to low flexibility of channel setting and installation.

RELATED TECHNICAL DOCUMENT

Patent Document

[Patent Document 1] Korean Patent Registration No. 10

SUMMARY OF THE INVENTION

Accordingly, it is an object of the present invention to provide a DVR having a source recognition automatic switched image receiving apparatus which is capable of automatically detecting whether an image signal is a SD signal or a HD-SDI signal in a channel and automatically switches between these signals, thereby allowing free channel change without requiring separate setting, which can result in higher flexibility of installation and channel setting and improved utilization of existing lines, and a method thereof.

It is another object of the present invention to provide a DVR having a source recognition automatic switched image receiving apparatus which is capable of fixing a HD-SDI instead of SD to an initial path, detecting the signal kind before reproduction of one frame and changing the path only for the SD, thereby minimizing an initial loss, which can result in highly-enhanced use convenience, and a method thereof.

It is still another object of the present invention to provide a DVR having a source recognition automatic switched image receiving apparatus which is capable of detecting the signal kind after the attenuation of the initial image signal is restored along the initial path fixed to the HD-SDI, independently of the kind of image signal, which can result in minimized possibility of error of signal determination due to the attenuation and hence high reliability of signal kind detection, and a method thereof.

It is still another object of the present invention to provide a DVR having a source recognition automatic switched image receiving apparatus which is capable of configuring a signal detection and path switching function to facilitate application for the signal kind detection and automatic switching, while maintaining a configuration of the existing receiver and SD analog decoder, which can result in improved versatility of product application.

It is still another object of the present invention to provide a DVR having a source recognition automatic switched image receiving apparatus which is capable of making initial memory management and assignment for image processing easer than that in the designation to the SD, as an initial path is fixed to the HD-SDI, which can result in very convenient following work such as memory segmentation and reallocation.

To achieve the above objects, according to an embodiment of the present invention, there is provided a DVR having a source recognition automatic switched image receiving apparatus, including: a path switching unit configured to receive an image signal not determined whether it is a SD signal or a HD-SDI signal, transmit an initial path to a HD-SDI signal compensating unit, the initial path designated under the presumption that the image signal is the HD-SDI signal, and switch the path to a SD analog decoder if it is determined that the image signal is the SD signal; a HD-SDI signal compensating unit configured to measure a loss of the image signal and automatically adjust a gain of the image signal to restore an attenuation of the image signal under the presumption that the image signal input from the path switching unit is the HD-SDI signal; a signal detecting unit configured to receive the image signal of less than one initial frame from the HD-SDI signal compensating unit, with the kind of the image signal unknown, detect whether the image signal is the HD-SDI signal or the SD signal according to a preset criterion, and provide the kind of the image signal to the path switching unit; a receiver configured to parallelize and decode the image signal input from the HD-SDI signal compensating unit; a SD analog decoder configured to decode the image signal input from the path switching unit, with the image signal determined as the SD signal; and an image processing unit configured to output an image decoded by the receiver or the SD analog decoder.

The signal detecting unit receives the image signal between the HD-SDI signal compensating unit and the receiver and detects the kind of the image signal.

The HD-SDI signal compensating unit may include: an adaptive equalizer configured to measure a loss depending on a length of a coaxial cable and automatically adjust a gain depending on an attenuation; and a re-clocker configured to remove a jitter of the input image signal.

Preferably, the re-clocker controls the image signal in an ADPLL (All-Digital Phase-Locked Loop) scheme.

Preferably, the re-clocker includes a P2D (Phase to Digital Converter) block for detecting a difference in phase between a reference clock and an output clock and outputting the phase difference as a digital code value, a digital loop filter block for filtering the digital code value, and a DCO (Digitally Controlled Oscillator) block for controlling an oscillation frequency using the digital code value of the digital loop filter.

The HD-SDI signal compensating unit may process an image signal of a digital image transmission standard of HD-SDI (High Definition Serial Digital Interface) of more than gigahertz unit.

Preferably, the HD-SDI signal compensating unit and the receiver are integrated into a single chip and the signal detecting unit receives the image signal between the HD-SDI signal compensating unit and the receiver and detects the kind of the image signal.

The DVR having a source recognition automatic switched image receiving apparatus further includes a control unit configured to control operation of the signal detecting unit, the receiver and the SD analog decoder.

The signal detecting unit may use a frequency band or signal format of the image signal to detect whether the image signal is the SD signal or the HD-SDI signal.

According to another embodiment of the present invention, there is provided a source recognition automatic switched image receiving method of a DVR having a source recognition automatic switched image receiving apparatus, including the steps of: by a path switching unit, receiving an image signal not determined whether it is a SD signal or a HD-SDI signal, transmitting an initial path to a HD-SDI signal compensating unit, the initial path designated under the presumption that the image signal is the HD-SDI signal, and switching the path to a SD analog decoder if it is determined that the image signal is the SD signal; by a HD-SDI signal compensating unit, measuring a loss of the image signal and automatically adjusting a gain of the image signal to restore an attenuation of the image signal under the presumption that the image signal input from the path switching unit is the HD-SDI signal; by a signal detecting unit, receiving the image signal of less than one initial frame from the HD-SDI signal compensating unit, with the kind of the image signal unknown, detecting whether the image signal is the HD-SDI signal or the SD signal according to a preset criterion, and providing the kind of the image signal to the path switching unit; by a receiver, parallelizing and decoding the image signal input from the HD-SDI signal compensating unit; by a SD analog decoder, decoding the image signal input from the path switching unit, with the image signal determined as the SD signal; and by an image processing unit, outputting an image decoded by the receiver or the SD analog decoder.

In the step of providing the kind of the image signal to the path switching unit, the signal detecting unit receives the image signal between the HD-SDI signal compensating unit and the receiver and detects the kind of the image signal.

The present invention has an advantage in that it provides a DVR having a source recognition automatic switched image receiving apparatus which is capable of automatically detecting whether an image signal is a SD signal or a HD-SDI signal in a channel and automatically switches between these signals, thereby allowing free channel change without requiring separate setting, which can result in higher flexibility of installation and channel setting and improved utilization of existing lines, and a method thereof.

The present invention has another advantage in that it provides a DVR having a source recognition automatic switched image receiving apparatus which is capable of fixing a HD-SDI instead of SD to an initial path, detecting the signal kind before reproduction of one frame and changing the path only for the SD, thereby minimizing an initial loss, which can result in highly-enhanced use convenience, and a method thereof.

The present invention has still another advantage in that it provides a DVR having a source recognition automatic switched image receiving apparatus which is capable of detecting the signal kind after the attenuation of the initial image signal is restored along the initial path fixed to the HD-SDI, independently of the kind of image signal, which can result in minimized possibility of error of signal determination due to the attenuation and hence high reliability of signal kind detection, and a method thereof.

The present invention has still another advantage in that it provides a DVR having a source recognition automatic switched image receiving apparatus which is capable of configuring a signal detection and path switching function to facilitate application for the signal kind detection and automatic switching, while maintaining a configuration of the existing receiver and SD analog decoder, which can result in improved versatility of product application.

The present invention has still another advantage in that it provides a DVR having a source recognition automatic switched image receiving apparatus which is capable of making initial memory management and assignment for image processing easer than that in the designation to the SD, as an initial path is fixed to the HD-SDI, which can result in very convenient following work such as memory segmentation and reallocation.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

Hereinafter, exemplary embodiments of the present invention will be described in detail with reference to the accompanying drawings.

Figure 2:
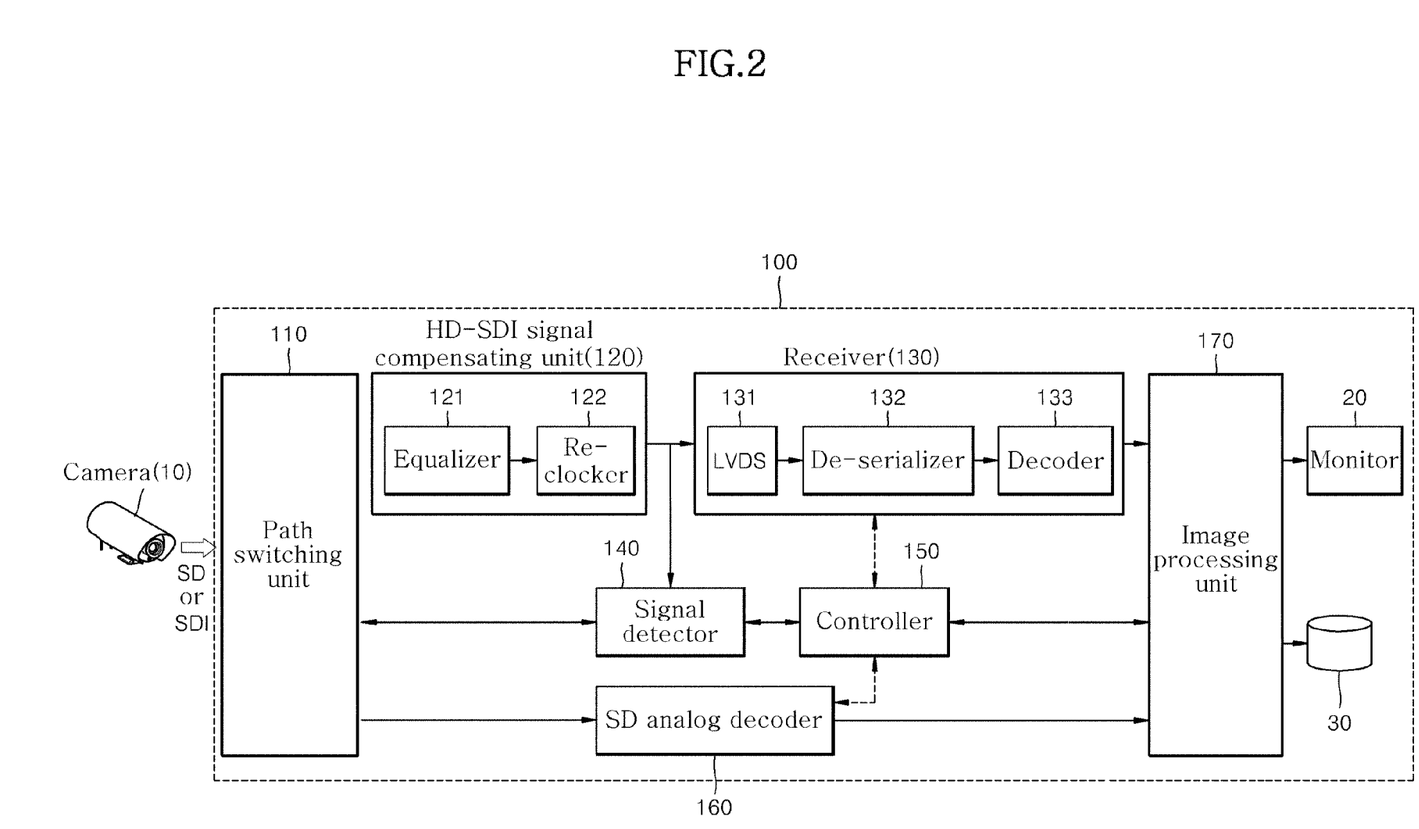
FIG. 2 is a configuration view of a DVR having a source recognition automatic switched image receiving apparatus according to one embodiment of the present invention.

FIG. 2 is a configuration view of a DVR (Digital Video Recorder) 100 having a source recognition automatic switched image receiving apparatus according to one embodiment of the present invention.

Referring to FIG. 2, a DVR 100 having a source recognition automatic switched image receiving apparatus according to one embodiment of the present invention includes a path switching unit 110 configured to receive an image signal not determined whether it is a SD signal or a HD-SDI signal, transmit an initial path to a HD-SDI signal compensating unit 120, the initial path designated under the presumption that the image signal is the HD-SDI signal, and switch the path to a SD analog decoder if it is determined that the image signal is the SD signal; a HD-SDI signal compensating unit 120 configured to measure a loss of the image signal and automatically adjust a gain of the image signal to restore an attenuation of the image signal under the presumption that the image signal input from the path switching unit 110 is the HD-SDI signal; a signal detecting unit 140 configured to receive the image signal of less than one initial frame from the HD-SDI signal compensating unit 120, with the kind of the image signal unknown, detect whether the image signal is the HD-SDI signal or the SD signal according to a preset criterion, and provide the kind of the image signal to the path switching unit; a receiver 130 configured to parallelize and decode the image signal input from the HD-SDI signal compensating unit 120; a SD analog decoder 160 configured to decode the image signal input from the path switching unit 110, with the image signal determined as the SD signal; and an image processing unit 170 configured to output an image decoded by the receiver 130 or the SD analog decoder 160.

The DVR 100 having the source recognition automatic switched image receiving apparatus according to the embodiment of the present invention further includes a control unit 150 configured to control operation of the signal detecting unit 140, the receiver 130 and the SD analog decoder 160.

The DVR 100 having the source recognition automatic switched image receiving apparatus according to the embodiment of the present invention can extend an image transmission distance by compensating a cable transmission loss of a HD-SDI signal through the HD-SDI signal compensating unit 120, which can result in reduced distance limitation and higher possibility of reutilization of existing lines.

In addition, the DVR 100 can determine whether the image signal connected to the same interface is a HD-SDI signal or the SD signal and automatically switch between these signals, which can result in high flexibility of channel setting and reduced use inconvenience.

In addition, the DVR 100 having the source recognition automatic switched image receiving apparatus according to the embodiment of the present invention assumes the image signal as the HD-SDI signal and operates the receiver 130 and the image processing unit 170 supporting the HD-SDI class and determines whether the image signal is the HD-SDI signal or the SD signal until a first image frame is processed. If the image signal is the HD-SDI signal, the operation is maintained. If the image signal is the SD signal, the image processing of the frame is cancelled and a path is switched to process the SD image, thereby minimizing an initial loss of the HD-SDI image.

On the contrary, assuming that an initial signal is of the SD class and the SD analog decoder 160 basically processes data until the kind of the initial signal is detected, if an input image is of the HD-SDI class, data of the HD-SDI class image having even more data amount than the SD class image may be lost until the signal determination, which may deteriorate the persistency of image monitoring.

In this way, the DVR 100 having the source recognition automatic switched image receiving apparatus according to the embodiment of the present invention can automatically detect whether the image signal is the SD signal or the HD-SDI signal in a channel and automatically switches between these signals, thereby allowing free channel change without requiring separate setting, which can result in higher flexibility of installation and channel setting and improved utilization of existing lines.

In addition, while maintaining the configuration of the existing receiver 130 and SD analog decoder 160, the signal detection and path switching function is configured to facilitate application for the signal kind detection and automatic switching, which can result in improved versatility of product application. In addition, as the initial path is fixed to the HD-SDI, initial memory management and assignment for image processing is easer than that in the designation to the SD, which can result in very convenient following work such as memory segmentation and reallocation.

In addition, the DVR 100 having the source recognition automatic switched image receiving apparatus according to the embodiment of the present invention preferably determine the kind of the input image signal using a signal whose attenuation is restored through the HD-SDI signal compensating unit 120, without direct detection of the image signal kind.

As a preferred embodiment, the HD-SDI signal compensating unit 120 includes an adaptive equalizer 121 configured to measure a loss depending on a length of a coaxial cable and automatically adjust a gain depending on an attenuation, and a re-clocker 122 configured to remove a jitter of the input image signal.

In addition, preferably, the HD-SDI signal compensating unit 120 processes an image signal of a digital image transmission standard of HD-SDI (High Definition Serial Digital Interface) of more than gigahertz unit.

The DVR 100 having the source recognition automatic switched image receiving apparatus according to the embodiment of the present invention employs the equalizer 121 and the re-clocker 122 to compensate a cable loss of the HD-SDI signal. At this time, for determination on the signal kind, instead of direct use of an input, a signal whose attenuation is restored through the equalizer 121 and the re-clocker 122 is used to determine the kind of a source and automatically determine an image source even when any of a HD-SDI camera and a SD camera is connected to an end of a long cable, which can result in a DVR storing the best image state.

In addition, the signal detecting unit 140 is arranged before the receiver 130 to determine whether an initially input signal is of a SD class or a HD class before an image of one frame is processed, which can result in the minimum of lost image data.

That is, as shown in FIG. 2, the path for the input signal is connected on the basis of HD-SDI, the input signal passes through the equalizer 121 and the re-clocker 122 in order to compensate for a cable loss preferentially to provide high reliability of the signal, and then, the signal detecting unit 140 determines whether or the input signal is the HD-SDI signal.

Accordingly, preferably, the signal detecting unit 140 receives the image signal between the HD-SDI signal compensating unit 120 and the receiver 130 and detects the kind of the image signal.

Alternatively, the HD-SDI signal compensating unit 120 and the receiver 130 are integrated into a single chip and the signal detecting unit 140 receives the image signal between the HD-SDI signal compensating unit 120 and the receiver 130 and detects the kind of the image signal.

In the DVR 100 having the source recognition automatic switched image receiving apparatus according to the embodiment of the present invention, if the signal detecting unit 140 determines that the input image signal is the SD signal, the image signal can be switched by the path switching unit 110 to the SD analog decoder 160 and an output of the receiver 130 or the SD analog decoder 160 is provided to the image processing unit 170 and is displayed on a screen 20 or stored as an image in a storage 30.

In this manner, the configuration of the signal detecting unit 140 to detect the signal kind using the attenuation-restored signal can minimize the possibility of a signal decision error due to an attenuation and hence provide high reliability.

In addition, as described above, the signal detecting unit 140 is configured to complete signal detection before image processing by using data of less than one frame of the input image signal whose initial path is designated to HD-SDI, and switch an output path even when the signal kind is detected to be the SD class. This configuration can limit the amount of lost data for signal detection to less than one frame for SD class, which can result in minimized initial loss for automatic switching and use of substantial normal operation.

In this manner, the DVR 100 having the source recognition automatic switched image receiving apparatus according to the embodiment of the present invention fixes the HD-SDI instead of SD to the initial path, detects the signal kind before reproduction of one frame and change the path only for the SD, thereby minimizing the initial loss, which can result in highly-enhanced use convenience.

The SD class image signal is of an analog format and has a frequency of less than 400 MHz, whereas the HD-SDI class image signal is of a digital format and has a frequency of more than 1.4 GHz.

Accordingly, as a preferred embodiment for the signal detection and determination, the DVR 100 having the source recognition automatic switched image receiving apparatus according to the embodiment of the present invention can be configured to determine the image signal to be the HD-SDI signal if the signal is detected to have a frequency of more than 1 GHz, or be the SD signal if the signal is detected to have a frequency of less than 500 MHz.

In addition, such determination may be made using different kinds of signal formats.

Accordingly, preferably, the signal detecting unit 140 uses a frequency band or signal format of the image signal to detect whether the image signal is the SD signal or the HD-SDI signal.

On the one hand, in a case where a high frequency signal is transmitted via a coaxial cable, this signal is attenuated in proportion to the square of the frequency due to a skin effect and the amount of attenuation is varied depending on a length of the coaxial cable. For the purpose of automatic correction against this attenuation, the HD-SDI signal compensating unit 120 employs the equalizer 121.

The equalizer 121 restores the image signal to its original size by amplifying the amount of attenuation. Specifically, the equalizer 121 measures a loss due to the cable length in an adaptive equalizing scheme and automatically adjusts a gain based on a result of the measurement to restore the HD-SDI image, through which a transmission distance can extend by 20 to 30% to allow the image to be used in existing CCTV infrastructures.

In addition, the HD-SDI signal compensating unit 120 includes the re-clocker 122 to remove a jitter component from a signal output from the equalizer 121.

The re-clocker 122 removes a jitter, which is introduced from a cable or the like, from a signal whose waveform is reproduced by gain adjustment in the equalizer 121.

As one embodiment, preferably, the re-clocker 122 controls the image signal in an ADPLL (All-Digital Phase-Locked Loop) scheme.

Figure 3:
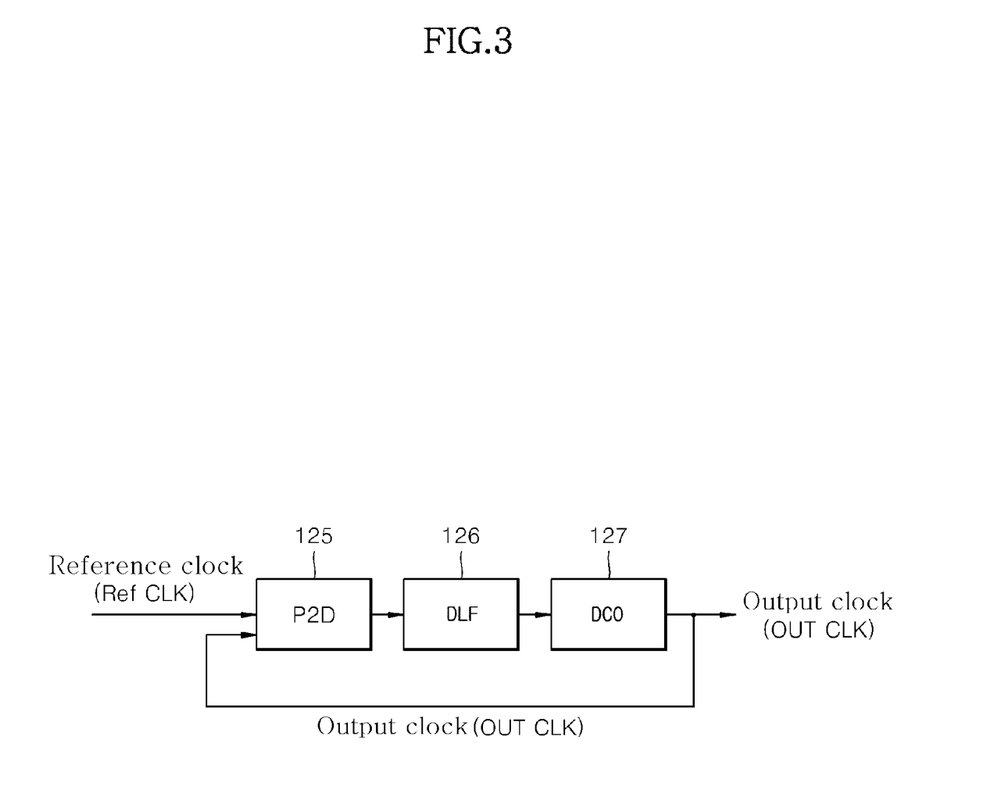
FIG. 3 is an exemplary view of ADPLL according to one embodiment of the present invention.

FIG. 3 is an exemplary view of ADPLL according to one embodiment of the present invention. Referring to FIG. 3, preferably, for the purpose of reducing a jitter included in a HD-SDI high frequency digital signal.

The DOC block 127 generates a frequency signal controlled according to a control signal and controls a frequency in a digital switching on/off manner using a VCO structure as it is. The DOC block 127 can be basically implemented with a ring type or an LC type.

As a preferred embodiment, the receiver 130 may include an LVDS (Low Voltage Differential Signaling) cable 131 for cabling, a de-serializer 132 for converting a signal of the LVDS cable 131 into a parallel signa, and a decoder 133 for decoding the parallel signal.

In addition, the receiver 130 may include a descramble module for restoring a scramble signal to an original signal, and a de-formatter for fining a horizontal, vertical or frame synchronization signal, detecting an error signal and outputting a status signal.

The de-serializer 132 converts an input serial signal into a parallel signal. For example, a data rate of 1.485 Gbps (based on HD) in a serial signal state, becomes 74.25 Mbps in a parallel signal state.

With the above-described configuration, the DVR 100 having the source recognition automatic switched image receiving apparatus according to the embodiment of the present invention can detect the signal kind after the attenuation of the initial image signal is restored along the initial path fixed to the HD-SDI, independently of the kind of image signal, which can result in minimized possibility of error of signal determination due to the attenuation and hence high reliability of signal kind detection.

Figure 4:
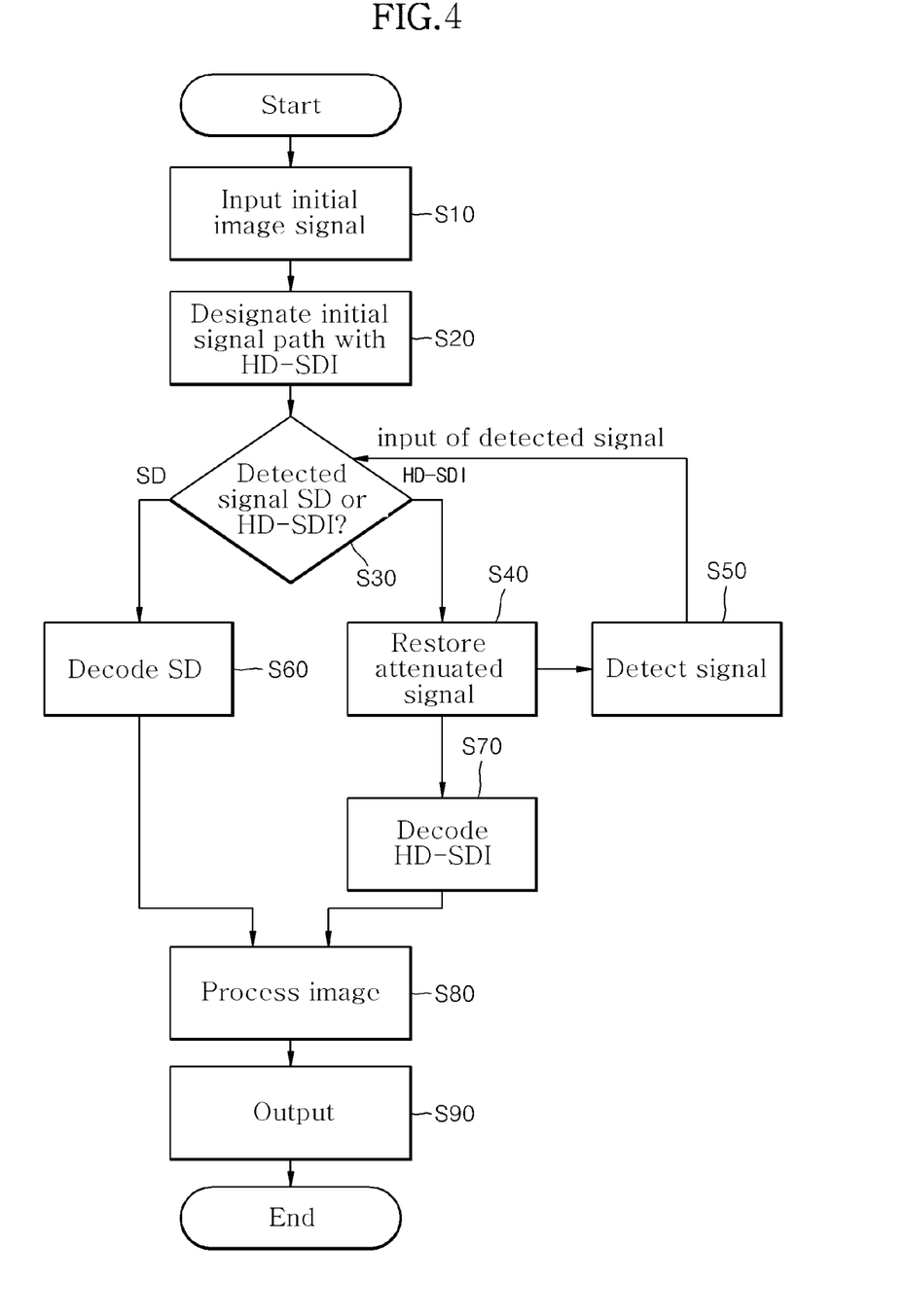
FIG. 4 is a flow chart of a source recognition automatic switched image receiving method according to one embodiment of the present invention.

FIG. 4 is a flow chart of a source recognition automatic switched image receiving method according to one embodiment of the present invention.

The source recognition automatic switched image receiving method includes the steps of: by the path switching unit 110, receiving (S10) an image signal not determined whether it is a SD signal or a HD-SDI signal, transmitting (S20) an initial path to a HD-SDI signal compensating unit, the initial path designated under the presumption that the image signal is the HD-SDI signal, and switching (S30) the path to a SD analog decoder if it is determined that the image signal is the SD signal; by the HD-SDI signal compensating unit (120), measuring a loss of the image signal and automatically adjusting a gain of the image signal to restore an attenuation of the image signal under the presumption that the image signal input from the path switching unit (110) is the HD-SDI signal (S40); by the signal detecting unit (140), receiving the image signal of less than one initial frame from the HD-SDI signal compensating unit (120), with the kind of the image signal unknown, detecting whether the image signal is the HD-SDI signal or the SD signal according to a preset criterion, and providing the kind of the image signal to the path switching unit (110) (S50); by the receiver (130), parallelizing and decoding the image signal input from the HD-SDI signal compensating unit (120) (S70); by the SD analog decoder (160), decoding the image signal input from the path switching unit (110), with the image signal determined as the SD signal (S60); and by the image processing unit (170), outputting an image decoded by the receiver (130) or the SD analog decoder (160) (S80 and S90).

Preferably, in the step (S50) of providing the kind of the image signal, the signal detecting unit (140) receives the image signal between the HD-SDI signal compensating unit (120) and the receiver (130) and detects the kind of the image signal.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A DVR having a source recognition automatic switched image receiving apparatus, comprising:
a path switching unit configured to receive an image signal not determined whether it is a SD signal or a HD-SDI signal, transmit an initial path to a HD-SDI signal compensating unit, the initial path designated under the presumption that the image signal is the HD-SDI signal, and switch the path to a SD analog decoder if it is determined that the image signal is the SD signal;
a HD-SDI signal compensating unit configured to measure a loss of the image signal and automatically adjust a gain of the image signal to restore an attenuation of the image signal under the presumption that the image signal input from the path switching unit is the HD-SDI signal;
a signal detecting unit configured to receive the image signal of less than one initial frame from the HD-SDI signal compensating unit, with the kind of the image signal unknown, detect whether the image signal is the HD-SDI signal or the SD signal according to a preset criterion, and provide the kind of the image signal to the path switching unit;
a receiver configured to parallelize and decode the image signal input from the HD-SDI signal compensating unit;
a SD analog decoder configured to decode the image signal input from the path switching unit, with the image signal determined as the SD signal; and
an image processing unit configured to output an image decoded by the receiver or the SD analog decoder,
wherein the signal detecting unit receives the image signal between the HD-SDI signal compensating unit and the receiver and detects the kind of the image signal.

2. A DVR having a source recognition automatic switched image receiving apparatus, comprising:
a path switching unit configured to receive an image signal not determined whether it is a SD signal or a HD-SDI signal, transmit an initial path to a HD-SDI signal compensating unit, the initial path designated under the presumption that the image signal is the HD-SDI signal, and switch the path to a SD analog decoder if it is determined that the image signal is the SD signal;
a HD-SDI signal compensating unit configured to measure a loss of the image signal and automatically adjust a gain of the image signal to restore an attenuation of the image signal under the presumption that the image signal input from the path switching unit is the HD-SDI signal;
a signal detecting unit configured to receive the image signal of less than one initial frame from the HD-SDI signal compensating unit, with the kind of the image signal unknown, detect whether the image signal is the HD-SDI signal or the SD signal according to a preset criterion, and provide the kind of the image signal to the path switching unit;
a receiver configured to parallelize and decode the image signal input from the HD-SDI signal compensating unit;
a SD analog decoder configured to decode the image signal input from the path switching unit, with the image signal determined as the SD signal; and
an image processing unit configured to output an image decoded by the receiver or the SD analog decoder,
wherein the HD-SDI signal compensating unit includes:
an adaptive equalizer configured to measure a loss depending on a length of a coaxial cable and automatically adjust a gain depending on an attenuation; and
a re-clocker configured to remove a jitter of the input image signal.

3. The DVR according to claim 2, wherein the re-clocker controls the image signal in an ADPLL (All-Digital Phase-Locked Loop) scheme.

4. The DVR according to claim 3, wherein the re-clocker includes a P2D (Phase to Digital Converter) block for detecting a difference in phase between a reference clock and an output clock and outputting the phase difference as a digital code value, a digital loop filter block for filtering the digital code value, and a DCO (Digitally Controlled Oscillator) block for controlling an oscillation frequency using the digital code value of the digital loop filter.

5. A DVR having a source recognition automatic switched image receiving apparatus, comprising:

a path switching unit configured to receive an image signal not determined whether it is a SD signal or a HD-SDI signal, transmit an initial path to a HD-SDI signal compensating unit, the initial path designated under the presumption that the image signal is the HD-SDI signal, and switch the path to a SD analog decoder if it is determined that the image signal is the SD signal;

a HD-SDI signal compensating unit configured to measure a loss of the image signal and automatically adjust a gain of the image signal to restore an attenuation of the image signal under the presumption that the image signal input from the path switching unit is the HD-SDI signal;

a signal detecting unit configured to receive the image signal of less than one initial frame from the HD-SDI signal compensating unit, with the kind of the image signal unknown, detect whether the image signal is the HD-SDI signal or the SD signal according to a preset criterion, and provide the kind of the image signal to the path switching unit;

a receiver configured to parallelize and decode the image signal input from the HD-SDI signal compensating unit;

a SD analog decoder configured to decode the image signal input from the path switching unit, with the image signal determined as the SD signal; and an image processing unit configured to output an image decoded by the receiver or the SD analog decoder, wherein the HD-SDI signal compensating unit processes an image signal of a digital image transmission standard of HD-SDI (High Definition Serial Digital Interface) of more than gigahertz unit.

6. A DVR having a source recognition automatic switched image receiving apparatus, comprising:

a path switching unit configured to receive an image signal not determined whether it is a SD signal or a HD-SDI signal, transmit an initial path to a HD-SDI signal compensating unit, the initial path designated under the presumption that the image signal is the HD-SDI signal, and switch the path to a SD analog decoder if it is determined that the image signal is the SD signal;

a HD-SDI signal compensating unit configured to measure a loss of the image signal and automatically adjust a gain of the image signal to restore an attenuation of the image signal under the presumption that the image signal input from the path switching unit is the HD-SDI signal;

a signal detecting unit configured to receive the image signal of less than one initial frame from the HD-SDI signal compensating unit, with the kind of the image signal unknown, detect whether the image signal is the HD-SDI signal or the SD signal according to a preset criterion, and provide the kind of the image signal to the path switching unit;

a receiver configured to parallelize and decode the image signal input from the HD-SDI signal compensating unit;

a SD analog decoder configured to decode the image signal input from the path switching unit, with the image signal determined as the SD signal; and an image processing unit configured to output an image decoded by the receiver or the SD analog decoder, wherein the HD-SDI signal compensating unit and the receiver are integrated into a single chip and the signal detecting unit receives the image signal between the HD-SDI signal compensating unit and the receiver and detects the kind of the image signal.

7. A DVR having a source recognition automatic switched image receiving apparatus, comprising:

a path switching unit configured to receive an image signal not determined whether it is a SD signal or a HD-SDI signal, transmit an initial path to a HD-SDI signal compensating unit, the initial path designated under the presumption that the image signal is the HD-SDI signal, and switch the path to a SD analog decoder if it is determined that the image signal is the SD signal;

a HD-SDI signal compensating unit configured to measure a loss of the image signal and automatically adjust a gain of the image signal to restore an attenuation of the image signal under the presumption that the image signal input from the path switching unit is the HD-SDI signal;

a signal detecting unit configured to receive the image signal of less than one initial frame from the HD-SDI signal compensating unit, with the kind of the image signal unknown, detect whether the image signal is the HD-SDI signal or the SD signal according to a preset criterion, and provide the kind of the image signal to the path switching unit;

a receiver configured to parallelize and decode the image signal input from the HD-SDI signal compensating unit;

a SD analog decoder configured to decode the image signal input from the path switching unit, with the image signal determined as the SD signal;

an image processing unit configured to output an image decoded by the receiver or the SD analog decoder; and a control unit configured to control operation of the signal detecting unit, the receiver and the SD analog decoder.

8. A DVR having a source recognition automatic switched image receiving apparatus, comprising:

a path switching unit configured to receive an image signal not determined whether it is a SD signal or a HD-SDI signal, transmit an initial path to a HD-SDI signal compensating unit, the initial path designated under the presumption that the image signal is the HD-SDI signal, and switch the path to a SD analog decoder if it is determined that the image signal is the SD signal;

a HD-SDI signal compensating unit configured to measure a loss of the image signal and automatically adjust a gain of the image signal to restore an attenuation of the image signal under the presumption that the image signal input from the path switching unit is the HD-SDI signal;

a signal detecting unit configured to receive the image signal of less than one initial frame from the HD-SDI signal compensating unit, with the kind of the image signal unknown, detect whether the image signal is the HD-SDI signal or the SD signal according to a preset criterion, and provide the kind of the image signal to the path switching unit;

a receiver configured to parallelize and decode the image signal input from the HD-SDI signal compensating unit;

a SD analog decoder configured to decode the image signal input from the path switching unit, with the image signal determined as the SD signal; and an image processing unit configured to output an image decoded by the receiver or the SD analog decoder, wherein the signal detecting unit uses a frequency band or signal format of the image signal to detect whether the image signal is the SD signal or the HD-SDI signal.

9. A source recognition automatic switched image receiving method of a DVR having a source recognition automatic switched image receiving apparatus, comprising the steps of:

a) by a path switching unit, receiving an image signal not determined whether it is a SD signal or a HD-SDI signal, transmitting an initial path to a HD-SDI signal compensating unit, the initial path designated under the presumption that the image signal is the HD-SDI signal, and switching the path to a SD analog decoder if it is determined that the image signal is the SD signal;

b) by a HD-SDI signal compensating unit, measuring a loss of the image signal and automatically adjusting a gain of the image signal to restore an attenuation of the image signal under the presumption that the image signal input from the path switching unit is the HD-SDI signal;
c) by a signal detecting unit, receiving the image signal of less than one initial frame from the HD-SDI signal compensating unit, with the kind of the image signal unknown, detecting whether the image signal is the HD-SDI signal or the SD signal according to a preset criterion, and providing the kind of the image signal to the path switching unit;
d) by a receiver, parallelizing and decoding the image signal input from the HD-SDI signal compensating unit;
e) by a SD analog decoder, decoding the image signal input from the path switching unit, with the image signal determined as the SD signal; and
f) by an image processing unit, outputting an image decoded by the receiver or the SD analog decoder,
wherein, in the step c), the signal detecting unit receives the image signal between the HD-SDI signal compensating unit and the receiver and detects the kind of the image signal.

* * * * *